(12) United States Patent
Cole et al.

(10) Patent No.: US 10,853,784 B2
(45) Date of Patent: Dec. 1, 2020

(54) REAL-TIME DETERMINATION OF RESOURCE AVAILABILITY FOR USAGE

(71) Applicant: BANK OF AMERICA CORPORATION, Charlotte, NC (US)

(72) Inventors: Kevin T. Cole, Charlotte, NC (US); Matthew Hsieh, Charlotte, NC (US); Scott R. Enscoe, Charlotte, NC (US); Caitlin Chrisman Bullock, Durham, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 536 days.

(21) Appl. No.: 14/987,003

(22) Filed: Jan. 4, 2016

(65) Prior Publication Data

US 2017/0193483 A1 Jul. 6, 2017

(51) Int. Cl.
G06Q 20/22 (2012.01)
G06F 3/0484 (2013.01)

(52) U.S. Cl.
CPC .......... *G06Q 20/22* (2013.01); *G06F 3/04847* (2013.01)

(58) Field of Classification Search
CPC ..................................................... G06Q 20/32
USPC .......................................................... 705/39
See application file for complete search history.

(56) References Cited

U.S. PATENT DOCUMENTS

| | | | |
|---|---|---|---|
| 5,751,805 A | * | 5/1998 | Otsuki .................... G06F 21/10 380/281 |
| 7,792,748 B1 | | 9/2010 | Ebersole et al. |
| 8,788,388 B2 | | 7/2014 | Chatterji et al. |
| 2002/0152145 A1 | | 10/2002 | Wanta et al. |
| 2004/0267665 A1 | | 12/2004 | Nam et al. |
| 2005/0150945 A1 | | 7/2005 | Choi |
| 2006/0195816 A1 | | 8/2006 | Grandcolas et al. |
| 2007/0011089 A1 | | 1/2007 | DeSchryver |
| 2007/0244811 A1 | | 10/2007 | Tumminaro |
| 2007/0255620 A1 | | 11/2007 | Tumminaro et al. |
| 2007/0265984 A1 | | 11/2007 | Santhana |
| 2007/0278290 A1 | | 12/2007 | Messerges et al. |
| 2008/0097851 A1 | | 4/2008 | Bemmel et al. |
| 2008/0126145 A1 | | 5/2008 | Rackley, III et al. |
| 2008/0167017 A1 | | 7/2008 | Wentker et al. |
| 2008/0207234 A1 | | 8/2008 | Arthur et al. |

(Continued)

OTHER PUBLICATIONS

Wikipedia, User Interface, Captured by Internet Archive WayBack Machine on Sep. 30, 2005 (Year: 2005).*

(Continued)

*Primary Examiner* — Cho Kwong
(74) *Attorney, Agent, or Firm* — Michael A. Springs; Moore & Van Allen PLLC; Nicholas C. Russell (57) ABSTRACT

Embodiments of the invention are directed to a system, method, or computer program product for providing a real-time determination of resource availability for usage via an interactive forecast interface with incorporated dashboard. In this way, the invention provides a real-time overlay forecast interface on a mobile device. The system gains access to one or more resources of a user and compiles the resources into an interactive forecast interface for visualization, manipulation, and mock manipulation of resources. The invention converts resource data extracted from the sources of the resource into a textual format encrypted for secure implementation and use into the interactive forecast interface.

15 Claims, 5 Drawing Sheets

(56) References Cited

U.S. PATENT DOCUMENTS

| | | |
|---|---|---|
| 2008/0208743 A1 | 8/2008 | Arthur et al. |
| 2008/0228637 A1 | 9/2008 | Scipioni et al. |
| 2008/0242274 A1 | 10/2008 | Swanburg et al. |
| 2009/0076912 A1 | 3/2009 | Rajan et al. |
| 2009/0094125 A1 | 4/2009 | Killian et al. |
| 2009/0119190 A1 | 5/2009 | Realini |
| 2009/0204916 A1 | 8/2009 | Benedek et al. |
| 2009/0271287 A1* | 10/2009 | Halpern .................. G06Q 20/10 705/26.1 |
| 2010/0094752 A1 | 4/2010 | Heath |
| 2010/0191602 A1 | 7/2010 | Mikkelsen et al. |
| 2010/0262449 A1 | 10/2010 | Monteforte et al. |
| 2010/0305997 A1 | 12/2010 | Ananian et al. |
| 2011/0106600 A1 | 5/2011 | Malik et al. |
| 2013/0173319 A1 | 7/2013 | Thomas et al. |
| 2014/0058912 A1 | 2/2014 | Bajaj |
| 2015/0073952 A1* | 3/2015 | Ventura .................. G06Q 40/12 705/30 |
| 2015/0154588 A1* | 6/2015 | Purves .................. G06Q 20/363 705/14.27 |
| 2015/0170130 A1 | 6/2015 | Patel et al. |
| 2016/0086152 A1 | 3/2016 | Shilkin |
| 2017/0078621 A1 | 3/2017 | Sahay et al. |
| 2017/0177135 A1 | 6/2017 | Sarin |

OTHER PUBLICATIONS

Wikipedia, Microsoft Windows, Captured by Internet Archive WayBack Machine on Aug. 31, 2006 (Year: 2006).*

* cited by examiner

REAL-TIME DETERMINATION OF RESOURCE AVAILABILITY FOR USAGE

BACKGROUND

Advancements in technology have made mobile devices with multi-faceted functionality available to large numbers of individuals. With the continued addition of new functions to these mobile devices, requirements for resource availability presentation and interface interactions is desired.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for providing a real-time determination of resource availability for usage via an interactive forecast interface with incorporated dashboard. In this way, the invention provides a real-time overlay forecast interface on a mobile device.

In some embodiments, the system may determine forecasted balance of resources based on current account balances, scheduled payments, and scheduled savings goals. Once determined, the invention may display the forecasted balance on the application of the user mobile device to enable the user to determine what amount to spend or move to savings. Thus, presenting a holistic resource view on a mobile device in an interactive interface overlaying a displaying screen on the mobile device. The system may provide a day-to-day real-time analysis of accounts to determine on a daily or monthly basis the amount of resources available for use for the user. Furthermore, the system may project savings for the user if the user selects to invest or add to a savings program. The system may also allow for bill payment smoothing by presenting a suggested average monthly payment for a cyclical payment that will account for the lows and peaks of the billing cycle. The system may provide a dashboard where the user can view a snapshot of savings activities and tools like goal, progress, forecasted balance, savings projections, spending categories, links to savings tools, and the like associated with all of the user's resources.

In some embodiments, the system further incorporates a savings tool that aims to achieve steady state expenses each month with respect to a user's resources. If the user underspends or spends less that a predicted budgeted amount for an expense, the system automatically transfers the difference into a separate account. For example, if the user has completed payments for an auto loan, the system may transfer the amount into a savings account to prevent reabsorption into the budget. Alternatively, the system may also achieve steady state resources by diverting any additional inflow to a savings account. In this way, if the user has large fluctuations in resources, this application would be suitable for steady state resource derivation.

Embodiments of the invention relate to systems, methods, and computer program products for real-time determination and manipulation of resources, the system comprising: determining resources available to a user including real-time resource levels, schedules, and goals for the resources; receiving authorization credentials from the user to access the resources; extracting resource data from a source of each resource available to the user; converting the extracted resource data into a textual format encrypted for use only on an interactive forecast interface; monitoring, continually, the resources available to the user for changes in resource levels; generating the interactive forecast interface for presenting the resources available to the user via a mobile device; presenting, upon authentication, the interactive forecast interface via overlay on a screen of the mobile device such that the interactive forecast displaces one or more portions of a session on the display, whereby manipulating the physical position of the displaying of the session; allowing manipulation of resources to move portions of resources to another source; and updating interactive forecast interface based on manipulation for current resource allocation and an impact of the manipulation on future resources.

In some embodiments, the invention further comprises: identifying, from the determined resources available to a user, cyclical payments to one or more vendors; parsing each identified cyclical payment to identify an amount, a vendor, date and an account for the cyclical payment; identifying a current payment with the vendor; comparing the current payment to the identified cyclical payments for the vendor; determining an underspend amount for the current payment relative to an amount of the identified cyclical payments for the vendor; extracting a difference between the underspend amount of the current payment from the amount of the identified cyclical payments for the vendor; and applying the difference to a generated resource from a new source.

In some embodiments, converting the extracted resource data into a textual format encrypted for use only on an interactive forecast interface further includes preventing the data from being readable in any medium other than the interactive forecast interface if data is removed from the interactive forecast interface.

In some embodiments, presenting the interactive forecast interface further comprises receiving an approved authentication credential from the user based on an authentication request presented to the user, wherein the authentication request requires user input of authorization credentials for a randomly selected resource available to the user. In some embodiments, the authentication request requires user input of authorization credentials for a randomly selected resource available to the user, wherein the authorization credentials for the randomly selected resource available to the user includes a username and password for web based access to information about the randomly selected resource at a web based server associated with the source for the randomly selected resource.

In some embodiments, the one or more portions of a session on the display further comprises a web session, text session, or telephone session of the user on the mobile device.

In some embodiments, the manipulation of resources to move portions of resources to another source comprises a mock manipulation of resources to visualize an impact on current and future resource sources the manipulation of the resources has for the user.

In some embodiments, the resources comprise financial resources of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" or "mobile device" may refer to mobile phones, personal computing devices, tablet computers, wearable devices, and/or any portable electronic device capable of receiving and/or storing data therein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. "Resources" include accounts of the user and/or other property owned by the user. The resources may be associated with accounts or may be property that is not associated with a specific account. Examples of resources associated with accounts may be accounts that have cash or cash equivalents, or accounts that are funded with or contain property, such as safety despots box account that jewelry, a trust account that is funded with property, or the like. Examples of resources that may not be associated with accounts may be antiques in a user's home, jewelry in a user's home, or the like. "Funds" or "Available Balance" are a balance in an account that can be invested or withdrawn. For example, the funds may refer to a bank ledger balance minus the amount of any monetary checks in the process of collection. Funds may also be referred to as an available balance, a collected balance, good funds, and usable funds.

Inflows refer to funds received from or deposited into the user's resources (e.g., user's accounts, or the like), such as paychecks, 401K disbursements, pension disbursements, rental property, or the like. Outflows refer to funds outgoing from the user's resources (e.g., user's accounts, or the like) to cover charges, such as payments for housing (e.g., rent or mortgage), bills, insurance and other costs, heat, water, food, car, boat, transportation, or like, which illustrates all of the essential (e.g., necessary or semi-necessary to the user) costs that cover what the user currently uses to live. A "payment" is a monetary amount or item of monetary value transferred from one individual or entity to another individual or entity in return for receipt of good(s) and/or services.

A "transaction" refers to any communication between a user and the financial institution or other entity monitoring the user's activities. For example, a transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

A "user" may be a financial institution user (e.g., an account holder or a person who have an account (e.g., banking account, credit account, or the like)). In one aspect, a user may be any financial institution user involved in retirement planning with the financial institution or any other affiliate entities associated with the financial institution. In some embodiments, the user may be an individual who may be interested in opening an account with the financial institution. In some other embodiments, a user may be any individual who may be interested in enrolling in the retirement plan offered by the financial institution. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "user" may be used interchangeably.

With advancements in technology infrastructures and wireless communication implementation, portable multi-function devices, such as laptop computers, tablet computers, mobile phones and the like are common. Typically, individuals may have a user device on them when in public.

These devices have the capability to hold large amounts of information, including personal information.

Embodiments of the present invention address the above needs and/or achieve other advantages by providing apparatuses (e.g., a system, computer program product and/or other devices) and methods for providing a real-time determination of resource availability for usage via an interactive forecast interface with incorporated dashboard. In this way, the invention provides a real-time overlay forecast interface on a mobile device.

In some embodiments, the system may determine forecasted balance of resources based on current account balances, scheduled payments, and scheduled savings goals. Once determined, the invention may display the forecasted balance on the application of the user mobile device to enable the user to determine what amount to spend or move to savings. Thus, presenting a holistic resource view on a mobile device in an interactive forecast interface overlaying a displaying screen on the mobile device. The system may provide a day-to-day real-time analysis of accounts to determine on a daily or monthly basis the amount of resources available for use for the user. Furthermore, the system may project savings for the user if the user selects to invest or add to a savings program. The system may also allow for bill payment smoothing by presenting a suggested average monthly payment for a cyclical payment that will account for the lows and peaks of the billing cycle. The system may provide a dashboard where the user can view a snapshot of savings activities and tools like goal, progress, forecasted balance, savings projections, spending categories, links to savings tools, and the like associated with all of the user's resources.

In some embodiments, the system further incorporates a savings tool that aims to achieve steady state expenses each month with respect to a user's resources. If the user underspends or spends less that a predicted budgeted amount for an expense, the system automatically transfers the difference into a separate account. For example, if the user has completed payments for an auto loan, the system may transfer the amount into a savings account to prevent reabsorption into the budget. Alternatively, the system may also achieve steady state resources by diverting any additional inflow to a savings account. In this way, if the user has large fluctuations in resources, this application would be suitable for steady state resource derivation.

Embodiments of the invention are directed to a system, method, or computer program product for a distributive network system with specialized data feeds associated with the distributive network and specific triggering events associated with the data feeds for coding and overlaying an interface and associated dashboard onto a displaying mobile device. Thus, the system may communicate with, store, and execute code on a mobile device for completion of overlay and presentation of a forecast interface. Furthermore, the system may manipulate and transform currently stored applications on a user device for overlay of the dashboard associated with the forecast interface.

Figure 1:
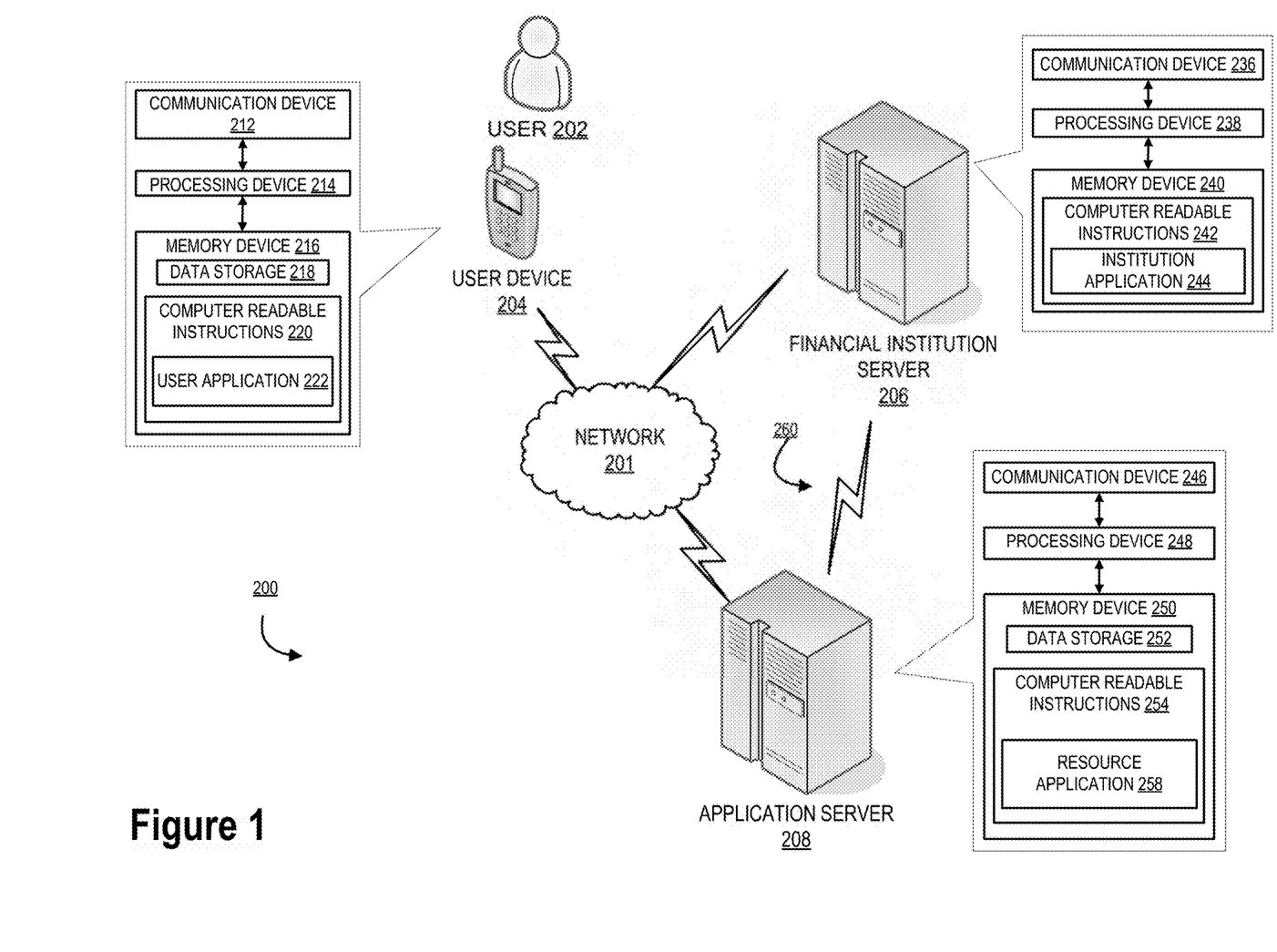
FIG. 1 provides a real-time resource availability determination system environment, in accordance with one embodiment of the present invention.

FIG. 1 illustrates a real-time resource availability determination system environment 200, in accordance with one embodiment of the present invention. FIG. 1 provides the system environment 200 for which the distributive network system with specialized data feeds associated with the real-time resource availability determination for overlay of an interactive forecast interface and dashboard with specific triggering events associated with data feeds for resource availability manipulation and visualization.

FIG. 1 provides a unique system that includes specialized servers and system communicably linked across a distributive network of nodes required to perform the functions of providing a real-time determination of resource availability for usage. Furthermore, the invention presents a forecast interface that may appear via overlay on a mobile device screen such as during a web session, texting session, telephone session, gaming session, or the like being conducted on the mobile device. Thus, the interface may displace one or more portions of the web session on the display, as such manipulating the physical position of the displaying of the web session, text session, telephone session or the like such that the dashboard may be displayed and visualized as an overlay.

As illustrated in FIG. 1, the application server 208 is operatively coupled, via a network 201 to the user system 204, and to the financial institution server 206. In this way, the application server 208 can send information to and receive information from the user device 204 and the financial institution server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has a user device, such as a mobile phone, tablet, or the like. FIG. 1 also illustrates a user system 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The user device 204 is a computing system that provide authentication for resource viewing and for interaction and manipulation of the forecast interface. The processing device 214 is operatively coupled to the communication device 212 and the memory device 216. The processing device 214 uses the communication device 212 to communicate with the network 201 and other devices on the network 201, such as, but not limited to the financial institution server 206 and the application server 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

In some embodiments, the user application 222 allows a user 202 to provide authentication for resource viewing and for interaction and manipulation of the forecast interface via the user device 204. In some embodiments, the user application 222 allows the user to sign onto or authenticate into the forecast interface. In this way, the user application 222 may allow the user access to the interactive forecast interface via authentication. Authentication into the interface may require at least one authentication into one or more of the resources. In this way, if a user has a checking account, the user application 222 may accept authentication into the checking account as an acceptable authentication into the forecast interface. The user application 222 based on communication from the application server 208 may randomly require the user to authenticate into the forecast interface by requesting a random resource account authentication credential to access the interface.

As further illustrated in FIG. 1, the application server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server 206 and the user system 204. As such, the communication device 246 generally comprises a modem, server, or other device for communicating with other devices on the network 201.

As further illustrated in FIG. 1, the application server 208 comprises computer-readable instructions 254 stored in the memory device 250, which in one embodiment includes the computer-readable instructions 254 of a resource application 258. In some embodiments, the memory device 250 includes data storage 252 for storing data related to the system environment, but not limited to data created and/or used by the resource application 258.

In the embodiment illustrated in FIG. 1 and described throughout much of this specification, the resource application 258 may determine resource balances, resource schedules, and resource savings goals, generating and displaying on the interactive forecast interface, presenting the interactive forecast interface, allowing manipulation both real and mock of the resources on the interface, and providing for steady state expenses.

In some embodiments, the resource application 258 may determine resource balances, resource schedules, and resource savings goals. In this way, the resource application 258 may communicate with the financial institution server 206, the user device 204, and merchants to identify resources the user may have. Furthermore, the resource application 258 may contact merchants to identify scheduled reoccurring payments that the user may have with one or more merchants, individuals, or the like.

In some embodiments, the resource application 258 may generate and display on the interactive forecast interface. The resource application 258 may display a forecast of the determine balances, schedules, and goals via an interactive interface that includes a selectable dashboard. The display is presented, in some embodiments, as an overlay over an already displaying mobile device display. Furthermore, the resource application 258 may parse out the resources including the monthly expenses of a user for a granular view of the individual resources of the user. In this way, the resource application 258 may parse out the identified resources and monthly expenses to a granular level, such that the date, time, product/service, amount, and merchant for each resource identified is revealed. In this way, the system may utilize and compile data received from the user, financial institution server 206, and merchants or vendors in order to identify the date, time, product/service, amount, and merchant for each identified resource and triggered cyclic expense.

The resource application 258 may convert data extracted from the sources into a structured format for monitoring and implementation into the forecast. In this way, the data may be converted into a textual format encrypted for security use for only real-time determination of resource availability forecast interfaces and dashboards. Once the data is removed from the interfaces or dashboards, the system encryption may prevent the data from being readable in any other medium.

In some embodiments, the resource application 258 may present the interactive forecast interface. In this way, the resource application 258 may be presented via overlay on the user device 204 screen such as during a web session, texting session, telephone session, gaming session, or the like being conducted on the user device 204. Thus, the interface may displace one or more portions of the web session on the display, as such manipulating the physical position of the displaying of the web session, text session, telephone session or the like such that the dashboard may be displayed and visualized as an overlay.

In some embodiments, the resource application 258 may providing for steady state expenses. In this way, the resource application 258 may compare historic expenses and the current expenses for a particular product/service or vendor compared to the user's budget for that expense, the resource application 258 may identify current expense level fluctuation or variation between the current expense and historic expenses to a user provided budget. In this way, the fluctuation or variation between each payment of the cyclical payment may be tracked to identify the variations over a time frame. Furthermore, the fluctuation and/or variation between the cyclical payment and the user's budget for that payment may also be tracked. Once the variations are identified over a time frame, the system may determine an average for the cyclical payments. Furthermore, the system may determine a termination period for the cyclical payments, such as a payoff point or the like associated with the cyclical payments.

Next, the resource application 258 may transfer funds from an identified under-spent expense to an alternative account. In this way, the resource application 258 may identify under-spent expenses, wherein under-spent expenses are one or more expenses that the user is overpaying on and/or have been paid off. Under-spent expenses further includes the identification of a lesser expense than the user's pre-established spending budget for that particular product/service. This way, the resource application 258 may continue to withdraw the amount required for the expense, but instead of directing the funds to the vendor, the resource application 258 may direct the funds to an alternative account such as a money market account, savings account, or the like. In this way, the resource application 258 may achieve a steady state of cyclical expenses by diverting additional resources to alternative accounts based on the identification of under-spent identification. For example, if a user budgeted an amount for an automobile payment every month. The system may identify that budgeted amount and notice the actual amount the user is paying for that automobile is a lower amount the budgeted. Thus, the system may extract the difference and place that difference in an alternative savings account. This way, the user may resource stabilize with respect to his/her budgeting, while increasing savings.

The resource application 258 may incorporate the resource stabilizer into the interactive forecast interface via a dashboard of the resource stabilizer for a steady state expense management for the user. The dashboard may appear via overlay on a mobile device screen such as during a web session, texting session, telephone session, gaming session, or the like being conducted on the mobile device. Thus, the dashboard may displace one or more portions of the web session on the display, as such manipulating the physical position of the displaying of the web session, text session, telephone session or the like such that the dashboard may be displayed and visualized as an overlay.

As illustrated in FIG. 1, the financial institution server 206 is connected to the application server 208 and is associated with a financial institution network. In this way, while only one financial institution server 206 is illustrated in FIG. 1, it is understood that multiple network systems may make up the system environment 200. The financial institution server 206 generally comprises a communication device 236, a processing device 238, and a memory device 240. The financial institution server 206 comprises computer-readable instructions 242 stored in the memory device 240, which in one embodiment includes the computer-readable instructions 242 of an institution application 244. The financial institution server 206 may communicate with the application server 208 to provide authentication credentials for resources and provide resource status information. While the application server 208 may communicate with the financial institution server 206 via a secure connection 260 generated for secure encrypted communications between the two systems for manipulating and transferring funds to one or more different resources.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2:
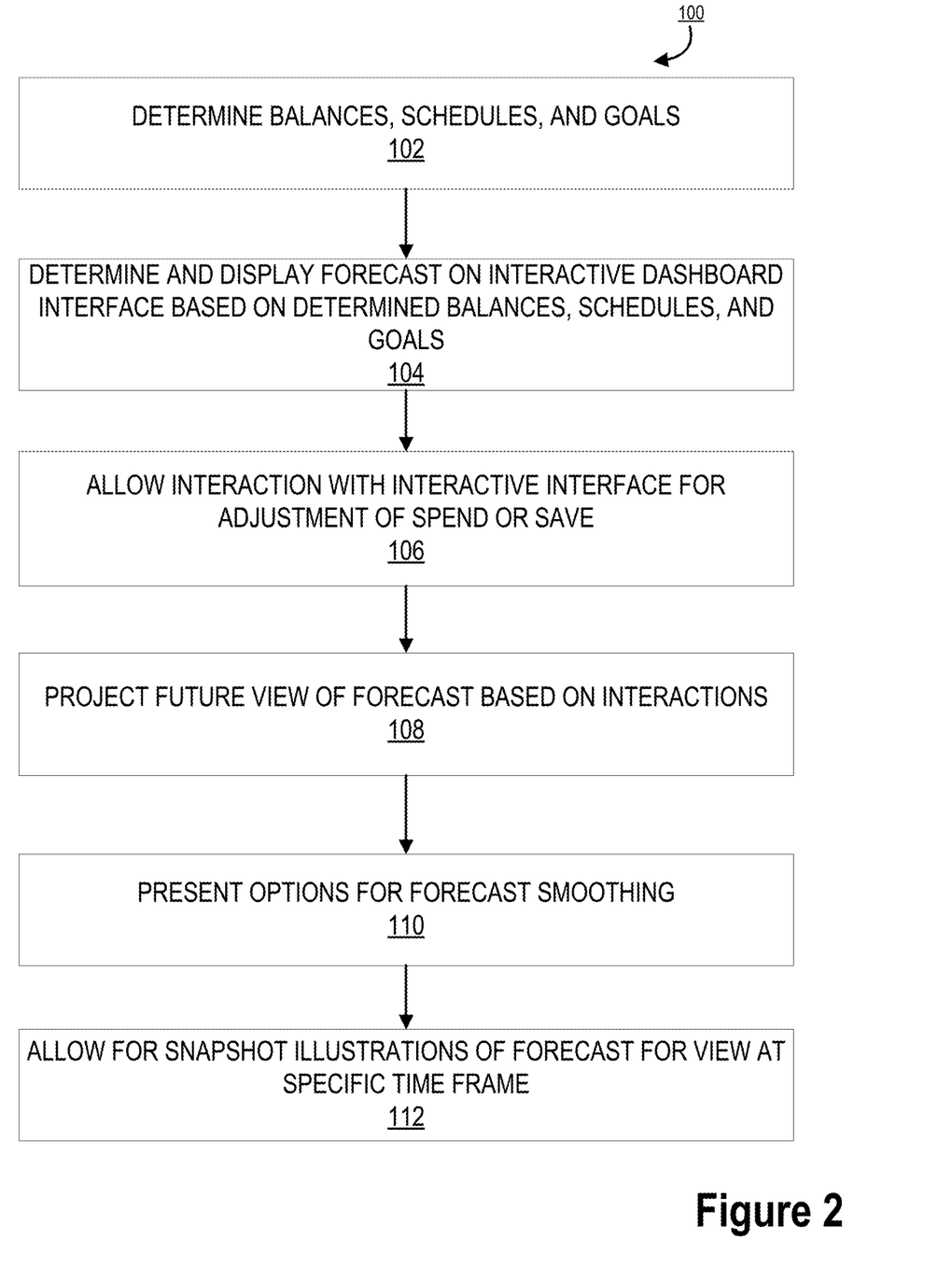
FIG. 2 provides a high level process flow illustrating the real-time determination of resource availability process, in accordance with one embodiment of the present invention.

FIG. 2 provides a high level process flow illustrating the real-time determination of resource availability process 100, in accordance with one embodiment of the present invention. As illustrated in block 102, the process 100 is initiated by determining balances, schedules, and goals for a user. In some embodiments, determining balances includes the current balance of any resources that the user has. These resources may include one or more accounts, funds, inflows, or the like. In some embodiments, determining schedules includes identifying scheduled reoccurring payments that the user may have with one or more merchants, individuals, or the like. In some embodiments, determining goals includes receiving and identifying savings and/or spending goals that a user may implement.

Next, as illustrated in block 104, the process 100 continues by determining and displaying a forecast of the determine balances, schedules, and goals via an interactive forecast interface that includes a selectable dashboard. The display is presented, in some embodiments, as an overlay over an already displaying mobile device display.

As illustrated on block 106, the process 100 continues by allowing user interaction with the interface. The interaction allows the user to manipulate spending and savings thus illustrating an adjustment to future spending and/or future saving. As such, the system presents the user with a real-time illustration of future resource implications based on the adjustments to spending and/or savings.

Next, as illustrated in block 108, based on the user interaction with the forecast interface, the system may project future view of a forecast for user resources. The forecast may illustrate all user resources and the impact of those resources upon one or more manipulations to the spending and/or saving of a user.

As illustrated in block 110, as part of the forecast interface, the system may provide the user with selectable options for forecast smoothing. Forecast smoothing is a system provided resource stabilization of cyclical bill paying. In this way, the system proposes a suggested average monthly payment to a vendor of a cyclical bill, such as for electric, water, or the like. The system presents the selected monthly payment to the vendor based on an average over a given time frame for that bill. This way, the system negotiations a level bill from that vendor all year around, thus smoothing a future forecast by knowing an amount required for payment of that bill for the remainder of a future time period. As illustrated in block 110, the system may contact one or more vendors and present options to the user for selection via the interface for forecast smoothing.

Next, as illustrated in block 112, once all data is compiled for user resource balances, schedules, and goals to present a current resource forecast, projections for future forecasts, and finally identification of options for forecast smoothing, the system may allow for snapshot illustrations of the forecast for resources at specific time frames in the past, present, or future.

Figure 3:
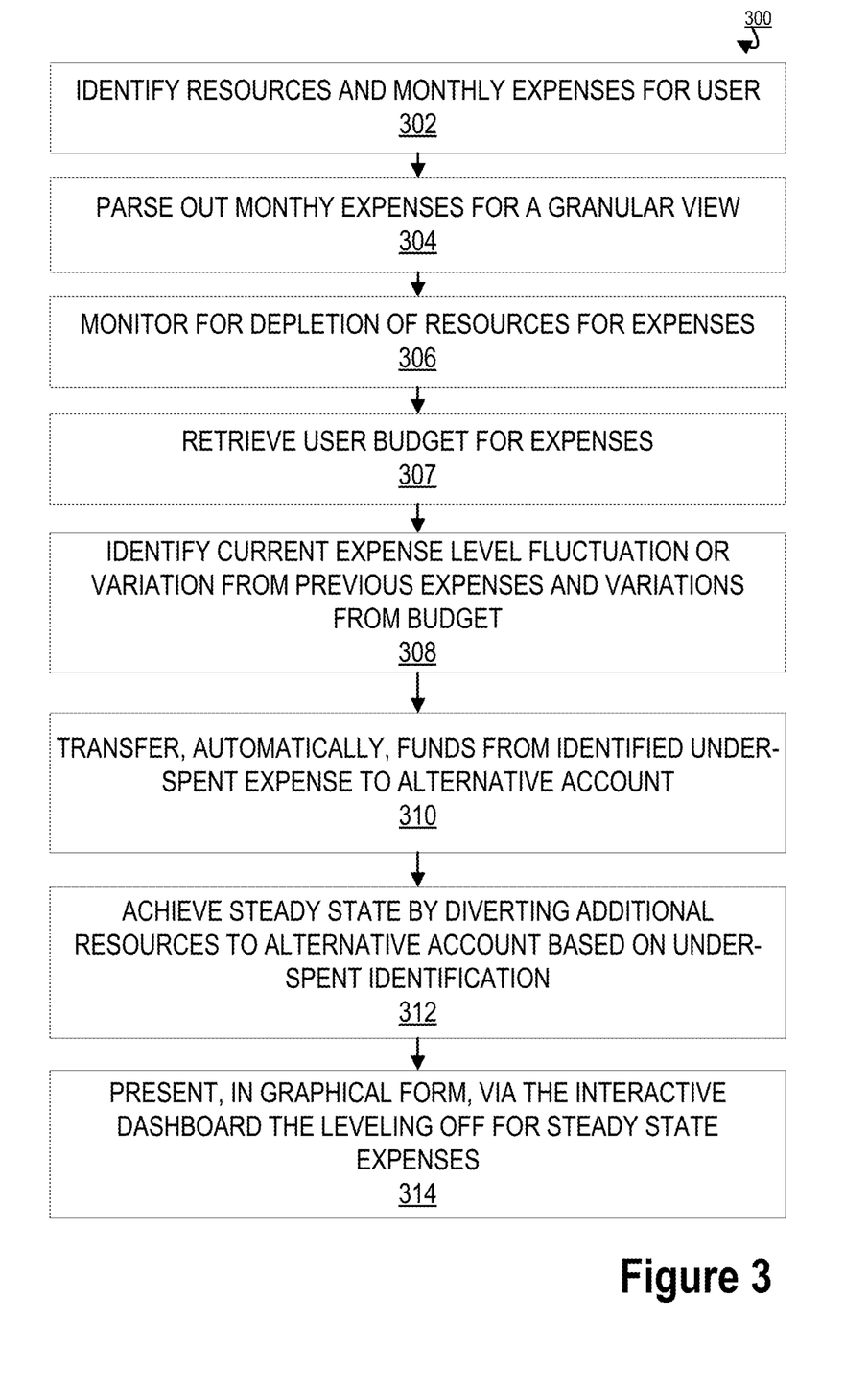
FIG. 3 provides a high level process flow illustrating a resource stabilizer application for the real-time determination of resource availability process, in accordance with one embodiment of the present invention.

FIG. 3 illustrates a high level process flow for a resource stabilizer resource application for the real-time determination of resource availability process 300, in accordance with one embodiment of the present invention. As illustrated in block 302, the process 300 is initiated by the system identifying the monthly expenses for the user. As such, similar to forecast smoothing, the system may first identify cyclical monthly expenses for the user. The system may extract data from financial institutions and identify patterns in payments from accounts of the user to one or more specific venders. These patterns may include cyclical payments to the same vendor, similar amounts of payments to the same vendor, or the like. In some embodiments, the system may, via communication linkage, communicate with the vendor directly in order to determine cyclical payments of a user.

Based on the identified monthly expenses, the process 300 continues by parsing out the monthly expenses for a granular view of the individual payment from the user, as illustrated in block 304. In this way, the system may parse out the identified monthly expenses to a granular level, such that the date, time, product/service, amount, and merchant for each payment identified is revealed. In this way, the system may utilize and compile data received from the user, financial institution, and vendor in order to identify the date, time, product/service, amount, and merchant for each identified cyclic expense. The system may convert data extracted from the sources into a structured format for monitoring and implementation into the forecast. In this way, the data may be converted into a textual format encrypted for security use for only real-time determination of resource availability forecast interfaces and dashboards. Once the data is removed from the interfaces or dashboards, the system encryption may prevent the data from being readable in any other medium.

In some embodiments, the term monthly or cyclic payment or expense may refer to any reoccurring payment a user may make to a vender, the reoccurring payment may be daily, weekly, monthly, yearly, or the like.

Next, as illustrated in block 306, the process 300 continues by monitoring for depletion of resources to identify current expenses of the user. As such, the system may build off of previously identified expenses to continually monitor for current expenses associated with the same vendor or cycle. As such, the system may continually identify new expenses associated with the previously identified cyclical expenses and track the amount of each new expense and the means in which the user pays for the expense. To monitor is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

Next, the system may extract or retrieve the user's budget information for each expense, as illustrated in block 307. In some embodiments, the user may have a budget for each cyclical expense, such as a loan payment, electric bill, or the like. These budgets may be utilized to later identify and produce a steady-state resource stabilizer for the user resources.

Based on a comparison historic expenses and the current expenses for a particular product/service or vendor compared to the user's budget for that expense, the system may identify current expense level fluctuation or variation between the current expense and historic expenses to the budget, as illustrated in block 308. In this way, the fluctuation or variation between each payment of the cyclical payment may be tracked to identify the variations over a time frame. Furthermore, the fluctuation and/or variation between the cyclical payment and the user's budget for that payment may also be tracked. Once the variations are identified over a time frame, the system may determine an average for the cyclical payments. Furthermore, the system may determine a termination period for the cyclical payments, such as a payoff point or the like associated with the cyclical payments.

Next, as illustrated in block 310, the system may transfer funds from an identified under-spent expense to an alternative account. In this way, the system may identify under-spent expenses, wherein under-spent expenses are one or more expenses that the user is overpaying on and/or have been paid off. Under-spent expenses further includes the identification of a lesser expense than the user's pre-established spending budget for that particular product/service. This way, the system may continue to withdraw the amount required for the expense, but instead of directing the funds to the vendor, the system may direct the funds to an alternative account such as a money market account, savings account, or the like.

In this way, as illustrated in block 312, the system may achieve a steady state of cyclical expenses by diverting additional resources to alternative accounts based on the identification of under-spent identification. For example, if a user budgeted an amount for an automobile payment every month. The system may identify that budgeted amount and notice the actual amount the user is paying for that automobile is a lower amount the budgeted. Thus, the system may extract the difference and place that difference in an alternative savings account. This way, the user may resource stabilize with respect to his/her budgeting, while increasing savings.

Finally, as illustrated in block 314, the process 300 ends by presenting, in graphical form, via the interactive forecast interface a dashboard of the resource stabilization for a steady state expense management for the user. The dashboard may appear via overlay on a mobile device screen such as during a web session, texting session, telephone session, gaming session, or the like being conducted on the mobile device. Thus, the dashboard may displace one or more portions of the web session on the display, as such manipulating the physical position of the displaying of the web session, text session, telephone session or the like such that the dashboard may be displayed and visualized as an overlay.

Figure 4:
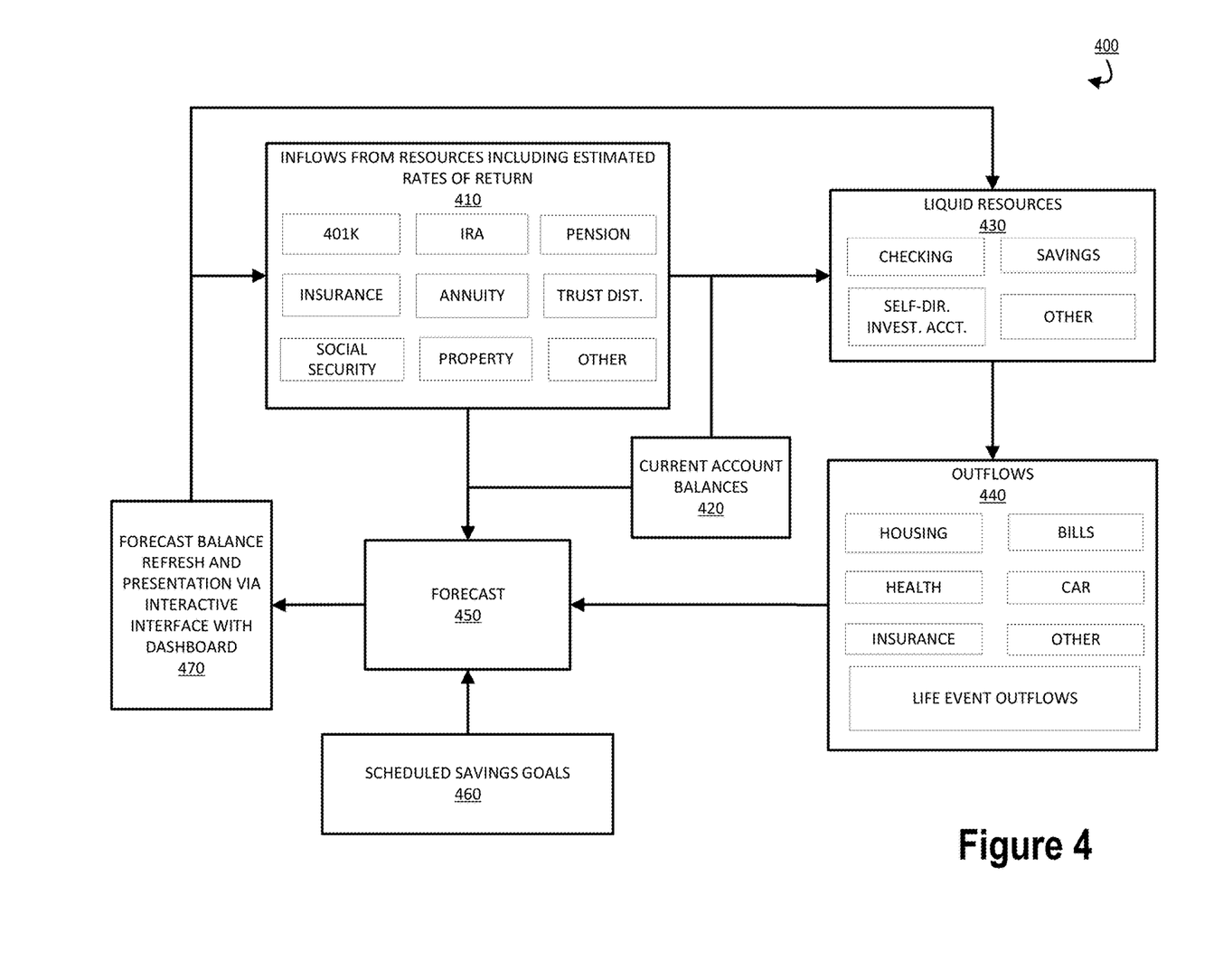
FIG. 4 provides a process map illustrating the real-time determination of resource availability process, in accordance with one embodiment of the present invention.

FIG. 4 illustrates a process map illustrating the real-time determination of resource availability process 400, in accordance with one embodiment of the present invention. Block 410 illustrates a number of resources, such as types of accounts, investments, annuities, property, or the like that may provide a stream of inflow or payments over a period of time, but which may also be illiquid or otherwise difficult to convert into cash. For example, types of resources that provide disbursements may be a 401K that requires minimum disbursements to the user over a period of time at a specific time; an IRA that requires minimum disbursements to the user over a period of time at a specific time; a pension account that may provide disbursements until the user passes away; insurance benefits that may be distributed as an annuity for a period of time or as a lump sum; a trust account from which disbursement are made, property that provides rental inflow to the user, social security inflow or death benefits that pays disbursements for a period of time (e.g., a specific amount of time or for the life of a beneficiary), or other like annuity. In some embodiments of the invention the resources may include estimated rates of returns such that not only are the disbursements used in determining the available fund amount and/or time parameter, but the principal and growth of the principal over time may be used in determining the available fund amount and/or time parameter.

Block 430 illustrates liquid (e.g., liquid or semi-liquid) resources, such as accounts that may be equivalent to cash or resources that can be converted quickly into cash. For example, the liquid accounts may be checking accounts, savings accounts, self-directed investment accounts, money market accounts, or the like. These liquid accounts may be utilized to pay for the outflows directly. In some embodiments these types of accounts may be one of the last accounts that may be utilized to pay for outflows after the inflows from block 410 are exhausted (e.g., with the exception of lifetime annuity accounts). Some of these accounts may also have rates of return (e.g., savings accounts, self-directed investment accounts, or the like) which may be factored in when calculating the available fund amount and/or the time parameter.

As illustrated in block 440 the outflows of the users may include the payments that the user makes in order to live. For example, in some embodiments the outflows may include housing outflows, which may cover the expenses of the user for house payments, taxes, insurance, or the like that the user has to pay in order to maintain a residence. In other examples, the outflows may be related to bills, such as electric, gas, water, or the like. The user may have car payments that are due on a monthly (or other time period) basis. The user may also have insurance payments for the user's car, life, or the like. In addition, there may be other outflows, such as but not limited to child care payments, cell phone payments, internet, and/or other entertainment expenses that may or may not be included in the outflow calculations (e.g., may or not be considered essentials or semi-essentials). The outflows may also include some life event outflows that may be easily predictable, non-repeating outflows, and/or only periodic outflows (e.g., occurs more than the time period for which the outflows are calculated), such as but not limited to paying for a child's college, paying for a wedding, or other like life events that affect the user's outflows. As illustrated by block 410 and 430 some of these outflows may be paid by one or more of the inflows, the supplemental employment inflow inflow, and/or the liquid resources either directly or indirectly. As such, one or more of the user's resources may have a balance that is depleted over time as the outflows are paid.

Block 420 illustrates a real-time current account balance for all resources available to the user based on the resources identified in block 410 and 430 and subtracted the up to the minute outflows from block 440.

It should be understood that the determination of the available fund amounts over the time period may change in real-time or near real-time as the rate of return on the resources change (e.g., stock values change, rental inflow changes or goes away, resources are depleted, big purchases are made or sold, or the like), and costs change (e.g., damage to property than needs repair, variable interest rate changes, life events occur that deplete resources, loans are taken out or paid off, or the like). As such, the present invention may be constantly in real-time or near real time, or over various intervals, recalculated in order to provide a more accurate available fund amount and/or time parameter to the user, such that the user is better able to plan for retirement. Moreover, as illustrated in further detail later the user may be able to adjust the available fund amount and/or the time parameter in order to determine how changes in spending habits affect the time at which the user's resources are depleted, or vice versa.

As illustrated in block 450, the process 400 continues by compiling the inflows 410, liquid resources 430, outflows 440, current balances 420, and scheduled savings goals 460 into a forecast including an interactive forecast interface with dashboard applications. The system may determine and subsequently display a forecast of the determine balances, payment schedules such as outflows, and goals via an interactive forecast interface that includes a selectable dashboard. The display is presented, in some embodiments, as an overlay over an already displaying mobile device display.

As illustrated on block 470, the forecast may refresh all balances, goals, and the like and be presented to a user via an interactive forecast interface with dashboards. The interaction allows the user to manipulate spending and savings thus illustrating an adjustment to future spending and/or future saving. As such, the system presents the user with a real-time illustration of future resource implications based on the adjustments to spending and/or savings. The interactive forecast interface including dashboard may appear via overlay on a mobile device screen such as during a web session, texting session, telephone session, gaming session, or the like being conducted on the mobile device. Thus, the dashboard may displace one or more portions of the web session on the display, as such manipulating the physical position of the displaying of the web session, text session, telephone session or the like such that the dashboard may be displayed and visualized as an overlay.

Based on the user interaction with the interface, the system may project future view of a forecast for user resources. The forecast may illustrate all user resources and the impact of those resources upon one or more manipulations to the spending and/or saving of a user via mock manipulation of the inflows 410, current balances 420, liquid resources 403, outflows 440, and scheduled goals 460 and circulate through the process 400 with these future looking projections based on the user manipulations. Thus, the system may present the user with a projected future forecast based on user manipulations of the various data points associated with the database.

Figure 5:
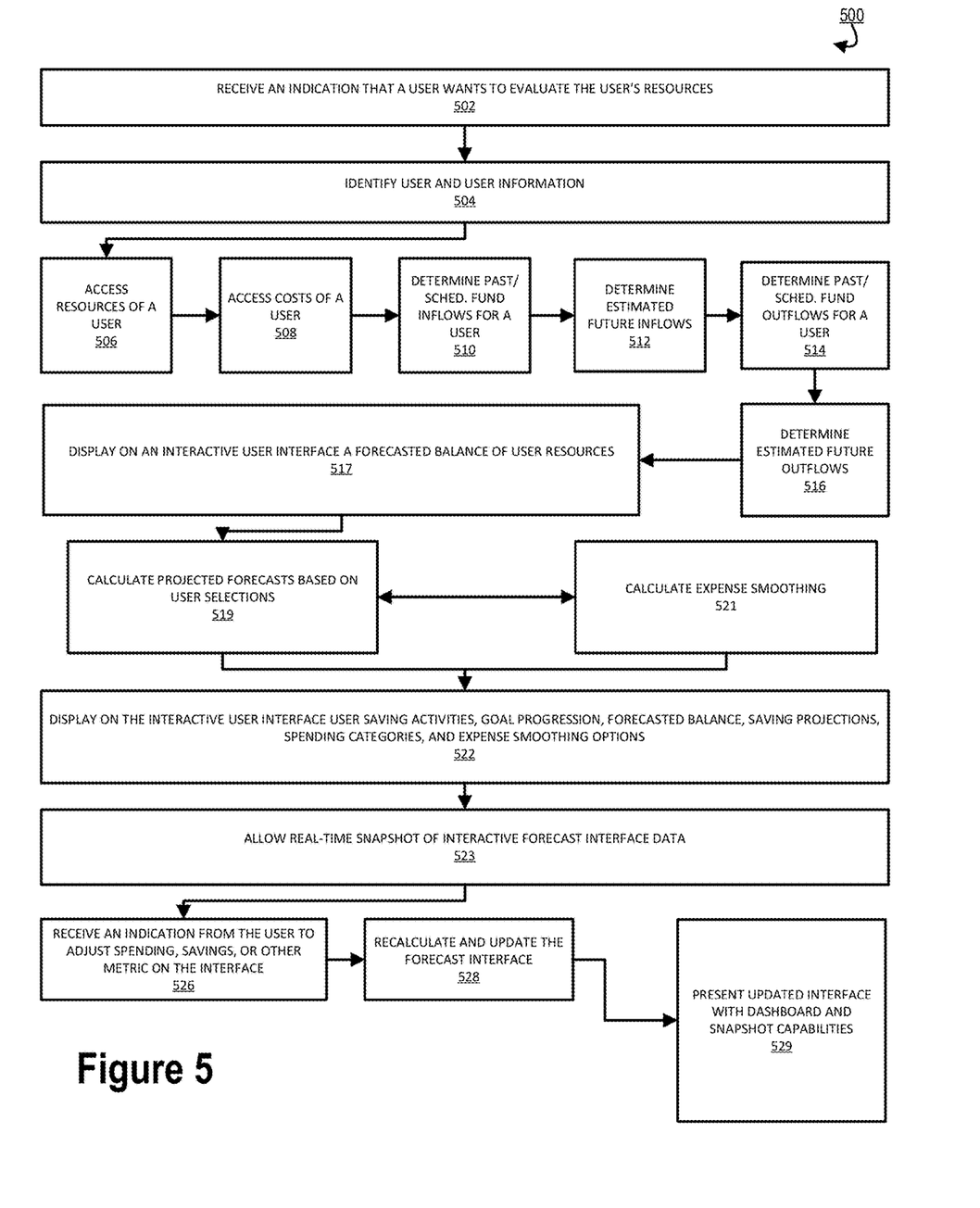
FIG. 5 provides a process map illustrating the real-time determination of resource availability process, in accordance with one embodiment of the present invention.

FIG. 5 illustrates a process map for the real-time determination of resource availability process 500, in accordance with one embodiment of the present invention. As illustrated by block 502, the system receives an indication that a user wants to evaluate his/her resources. For example, the user may desire a real-time view of all resources available to the user. In another example, the user may desire to manipulate his/her resources and distribute the resources to various other accounts or the like. In yet another example, the user may desire to perform a mock resource move, thus the system may illustrate how the mock move of resources may affect all of the user's resource at a current time or future time.

As illustrated by block 504, the system may identify the user and user information for authorization to access the forecast interface. As such, in order to access the interactive forecast interface the user may be required to authenticate. Authentication into the interface may require at least one authentication into one or more of the resources. In this way, if a user has a checking account, the system may require authentication into the checking account in order to open the interactive forecast interface to visualize all resources associated with the user. The system may randomly require the user to authenticate into the forecast interface by requesting a random resource account authentication credential to access the interface. In this way, the user may have a different username, password, or alternative credential to access each account associated with a user resource. In this way, the user may have Password 1 for a checking account, Username 2 and Password 2 for accessing a savings account, Username 1 and Password 3 for accessing a loan account, or the like. As such, the system may store each of these various authentication credentials and require the user to provide one of those credentials in order to visualize the interface.

Once the user has been authenticated and the user information has been identifies, the system may access real-time information about each of the user's resources. Block 506 illustrates that the system may access the resources of the user (e.g., the resources described with respect to blocks 410 and 430 in FIG. 4). For example, the system accesses resource information from the user's accounts that a financial institution services. In this way, the system may utilize the authorization information provided from the user to access, via web portals, the resource activity. In other embodiments, the system may contact one or more financial institutions or entities holding user resources to request and obtain access to the resource information. The user may also allow the system to access the user's accounts with other third-parties and/or financial institutions. Moreover, the system may evaluate other resources that the system knows that the user owns, such as for example the system has information about the property that the user's own, and thus can evaluate the value of the resource and/or the future value over of the resource over time.

As illustrated in block 508 the system accesses the costs of the user (e.g., the costs described with respect to block 440 in FIG. 4). For example, the system accesses costs information from the user's accounts that a financial institution services. The user may also allow the system to access the user's accounts with other third-party financial institutions (e.g., first mortgage, second mortgage, or the like). As such, the system may evaluate the costs that the user has that may affect the forecast planning of the user.

It should be understood that with respect to blocks 506 and 508, as well as otherwise described herein, in some embodiments of the invention the current and/or future fair market value of the resources or costs may be determined by accessing third-party servers, systems, devices, applications, or the like in order to determine the fair market values. For example, the system may access websites that provide estimates of home values, car values, antique values, or the like.

Block 510 illustrates that the system determines the past/future fund inflows for the user. For example, the system can determine the amount of funds that the user has received from various accounts within and outside of a financial institution over time. With respect to the accounts serviced by a financial institution the system may access to the past/future fund inflows. With respect to accounts located outside a financial institution the past fund inflows may be determined by identifying the inflow of funds into the accounts held by a financial institution. Moreover, as previously discussed the user may allow the system to access the user's accounts to determine any past/future funds that the user may receive from various resources. Moreover, the system may determine the resources of the user that have yet to provide inflows. In some embodiments the system may estimate the future inflow of funds, for example, if the user receives the same payments continuously in consecutive time periods the system may continue to estimate the same fund receipts in future time periods.

In some embodiments, the user may have resources that only the user is aware of, and as such the user may provide an indication of the unidentified resources to the system to include in the calculation of the user's resources and/or fund in-flows for the forecast interface. In some embodiments the unidentified resources may include money being paid back for a loan provided by the user that the system does know about, the user is a beneficiary of an account that the system does not know about, the user is a silent partner in business that the system does not know about, or the like.

In some embodiments, the system may analyze the outflows in order to determine what may qualify as an outflow that is necessary (e.g., necessary or semi-necessary to cover cost of living expenses), such as mortgages, heat, water, gas, phone, internet, or the like, from any discretionary spending that may cover payments the user may make for entertainment (e.g., trips, dinner out, movies, shows, presents, or the like), such as payments that would be covered by the calculated available fund amount. As such, the transactions made by the user that may be discretionary may be utilized to determine an estimated available fund amount that the user is currently spending, which may be augmented by inflation rates in order to determine what the available fund amount may be in the future. As such, the available fund amount may be set in order to determine what the user likely wants to have available to the user in the future.

Block 512 illustrates that the system determines the estimated future inflows that the user receives based on the past inflows and future inflows determined from block 510. The system may determine the estimated inflows that the user may receive (e.g., may decide to receive, may be required to receive based on applicable laws, or the like) in the future. The estimated inflows may be averaged over a one or more time periods (e.g., short term, long term, or the like), may be determined for one or more time periods, or may be determine until reaching the parameter. In some embodiments, the estimated future inflows may be based on a user mock movement of resources from one account to another. In this way, the system may determine the impact of a movement of resources on the other resources associated with the user.

Block 514 illustrates that the system determines the past and future scheduled fund outflows for the user. For example, the system can determine the amount of funds that user has paid from various accounts within and outside of a financial institution over time to a specific vendor or on a cyclical pattern. In this way, the system may identify monthly expenses for the user. The system may first identify cyclical monthly expenses for the user. The system may extract data from financial institutions and identify patterns in payments from accounts of the user to one or more specific venders. These patterns may include cyclical payments to the same vendor, similar amounts of payments to the same vendor, or the like. In some embodiments, the system may, via communication linkage, communicate with the vendor directly in order to determine cyclical payments of a user.

Based on the identified monthly expenses, the system may parsing out the monthly expenses for a granular view of the individual payment from the user. In this way, the system may parse out the identified monthly expenses to a granular level, such that the date, time, product/service, amount, and merchant for each payment identified is revealed. In this way, the system may utilize and compile data received from the user, financial institution, and vendor in order to identify the date, time, product/service, amount, and merchant for each identified cyclic expense.

The system may access to the past/future fund outflows by examining the payments that the user has made over time (e.g., in the past) and/or has scheduled in the future. This may be performed by accessing a financial institution system or via system authorization for access to the resources of the user based on user provided authorization credentials. In some embodiments the system may estimate the future outflow of funds, for example, if the user makes the same payments continuously in consecutive time periods the system may continue to estimate the same payment in future time periods. For example, the system can determine the amount of funds that the user has sent for payment from various accounts within and outside of a financial institution over time. Moreover, the system may determine the costs of the user that have yet to provide outflows (e.g., annuity payments that the user may make in the future, payments scheduled for a trust account, payments to fund a future resource purchase, or the like). In some embodiments the system may estimate the future outflow of funds, for example, if the user makes the same payments continuously in consecutive time periods the system may continue to estimate the same payments in future time periods.

In some embodiments, the user may have costs that only the user is aware of, and as such the user may provide an indication of the unidentified costs to the system to include in the system's calculation of the user's costs and/or fund out-flows. In some embodiments the unidentified costs may include money the user is paying back for a loan provided to the user (e.g., loan from a family member or friend, or the like) that the system does know about, the user is supporting a dependent that the financial institution does not know about, the user is a silent partner in business that the system does not know about, or the like.

Block 516 illustrates that the system determines the estimated future outflows that the user pays based on the past outflows and future outflows. The system may determine the estimated outflows that the user may pay (e.g., may decide to pay, may be required to pay based on applicable laws, payments made to cover costs, or the like) in the future. The estimated outflows may be averaged over a one or more time periods (e.g., short term, long term, or the like), may be determined for one or more time periods, or may be determine until reaching a user specified parameter.

Next, as illustrated in block 517, the system may display on an interactive forecast interface a forecasted balance of the user resources. As such, the system may convert data extracted from the sources in blocks 506, 508, 510, 512, 514, and 516 into a structured format for monitoring and implementation into the forecast. In this way, the data may be converted into a textual format encrypted for security use for only real-time determination of resource availability forecast interfaces and dashboards. Once the data is removed from the interfaces or dashboards, the system encryption may prevent the data from being readable in any other medium.

As illustrated in block 519, the system may calculate a projected forecast based on user selections. In this way, the user may select, via the interactive forecast display of block 517 to manipulate in a mock or example fashion various resources to illustrate the effect of the manipulation on other resources at present or in the future. Furthermore, the interactive forecast display of block 517 also allows for real transfer and manipulation of funds across the resources of the user.

As illustrated in block 521, the system may also calculate expense smoothing for the user. Expense smoothing is detailed above in FIG. 3. Based on the identified resources from blocks 506, 508, 510, 512, 514, and 516, the system may determine a granular level of each expense associated with a resource. In this way, the date, time, product/service, amount, and merchant for each expense or payment identified is revealed for identified cyclical payments. In this way, the system may utilize and compile data received from the user, financial institution, and vendor in order to identify the date, time, product/service, amount, and merchant for each identified cyclic expense. Next, the system may extract or retrieve the user's budget information for each expense. In some embodiments, the user may have a budget for each cyclical expense, such as a loan payment, electric bill, or the like. These budgets may be utilized to later identify and produce a steady-state resource stabilizer for the user resources.

Based on a comparison historic expenses and the current expenses for a particular product/service or vendor compared to the user's budget for that expense, the system may identify current expense level fluctuation or variation between the current expense and historic expenses to the budget. In this way, the fluctuation or variation between each payment of the cyclical payment may be tracked to identify the variations over a time frame. Furthermore, the fluctuation and/or variation between the cyclical payment and the user's budget for that payment may also be tracked. Once the variations are identified over a time frame, the system may determine an average for the cyclical payments. Furthermore, the system may determine a termination period for the cyclical payments, such as a payoff point or the like associated with the cyclical payments. The system may transfer, automatically, funds from an identified under-spent expense to an alternative account. In this way, the system may identify under-spent expenses, wherein under-spent expenses are one or more expenses that the user is overpaying on and/or have been paid off. Under-spent expenses further includes the identification of a lesser expense than the user's pre-established spending budget for that particular product/service. This way, the system may continue to withdraw the amount required for the expense, but instead of directing the funds to the vendor, the system may direct the funds to an alternative account such as a money market account, savings account, or the like. As such, system may achieve a steady state of cyclical expenses by diverting additional resources to alternative accounts based on the identification of under-spent identification. For example, if a user budgeted an amount for an automobile payment every month. The system may identify that budgeted amount and notice the actual amount the user is paying for that automobile is a lower amount the budgeted. Thus, the system may extract the difference and place that difference in an alternative savings account. This way, the user may resource stabilize with respect to his/her budgeting, while increasing savings.

Next, as illustrated in block 522, the system may display the expense smoothing along with the savings activities, goal progression, saving projections, spending categories, and forecasts onto the forecast interface and/or onto selectable dashboards associated therewith. The interface and dashboards may appear via overlay on a mobile device screen such as during a web session, texting session, telephone session, gaming session, or the like being conducted on the mobile device. Thus, the interface may displace one or more portions of the web session on the display, as such manipulating the physical position of the displaying of the web session, text session, telephone session or the like such that the interface may be displayed and visualized as an overlay.

As illustrated in block 523, the system allows a user to take a real-time snapshot of the interactive forecast interface data. The snapshot may be stored and exported to one or more programs for resource management or storage. Otherwise, the data on the forecast interface that has been converted into a textual format encrypted for security use for only real-time determination of resource availability forecast interfaces and dashboards. Once the data is removed from the interfaces or dashboards, the system encryption may prevent the data from being readable in any other medium.

As illustrated in block 526, the system, via the interface may receive an indication from the user to adjust spending, saving, or other illustrated metrics on the interface. In some embodiments, the user may be preparing for a large purchase with the adjustment and wishing to view resource implications from the purchase. In other embodiments, the adjustment may reflect an actual move of resources, such as a purchase or reallocation of resources to one or more alternative sources. In yet other embodiments, the adjustment may be a mock adjustment to visualize different accounts or mediums for a user to put resources. The system may also allow a user to add an additional mock account to add resources to, thus giving the user a visualization of overall resources if implementing a new account. As such, this may provide a user with a past, future, or present view of all resources allocated in a variety of ways to determine the best allocation for the user at that time.

As illustrated in block 528, the system may recalculate and update the forecast interface with the adjustments from block 526. Finally, the system may present the user with the updated interface with dashboards and similar snapshot capabilities for the updated adjustments, as illustrated in block 529.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 14/987,721 | RESOURCE OPTIMIZATION ALLOCATION SYSTEM | Concurrently herewith |
| 14/987,722 | RESOURCE ALLOCATION BASED ON AVAILABLE RESOURCES VIA INTERACTIVE INTERFACE | Concurrently herewith |
| 14/986,996 | PREDICTIVE UTILIZATION OF RESOURCES AND ALARM SYSTEM | Concurrently herewith |
| 14/987,725 | REAL TIME RESOURCE TRACKING AND ALLOCATION SYSTEM | Concurrently herewith |
| 14/987,008 | REALLOCATION OF RESOURCES SYSTEM | Concurrently herewith |

What is claimed is:

1. A system for real-time determination and manipulation of resources, the system comprising:
   a memory device with computer-readable program code stored thereon;
   a communication device;
   a processing device operatively coupled to the memory device and the communication device, wherein the processing device is configured to execute the computer-readable program code to:
      determine resources available to a user including real-time resource levels, schedules, and goals for the resources;
      receive authorization credentials from the user to access the resources, wherein the authorization credentials comprise multiple different usernames and passwords for web based access to information about each resource available to the user;
      extract resource data from a source of each resource available to the user;
      convert the extracted resource data into a textual format encrypted for use only on an interactive forecast interface, wherein preventing the extracted resource data from being readable in any medium other than the interactive forecast interface if extracted resource data is removed from the interactive forecast interface;
      monitor, continually, the resources available to the user for changes in resource levels;
      generate the interactive forecast interface for presenting the resources available to the user via a mobile device;
      transmit an authentication request to the user via the mobile device for the user to provide authorization credentials in order to authorize the user to continue using the interactive forecast interface, wherein the authentication request comprises a request for one username and password of the multiple different usernames and passwords for web based access to information about each resource available to the user, and wherein any of the multiple different usernames and passwords for web based access to information about each resource available to the user may be requested to allow access to the interactive forecast interface;
      present, upon authentication, the interactive forecast interface via overlay on a screen of the mobile device via manipulation and transformation of currently stored applications on the mobile device such that the interactive forecast physically displaces one or more portions of a session of the currently stored applications on the display of the mobile device, wherein the interactive forecast is presented as an overlay on a mobile device screen that is currently presenting a web session, texting session, telephone session, or gaming session and manipulates and transforms the currently presented session;
      allow manipulation of resources to move portions of resources to another source, wherein the manipulation is a mock manipulation to mediums of resources for visual implementation of implementing of the mock manipulation illustrating adjustments on current resources; and
      update interactive forecast interface based on manipulation for current resource allocation and an impact of the manipulation on future resources.

2. The system of claim 1, further comprising:
   identifying, from the determined resources available to a user, cyclical payments to one or more vendors;
   parsing each identified cyclical payment to identify an amount, a vendor, date and an account for the cyclical payment;
   identifying a current payment with the vendor;
   comparing the current payment to the identified cyclical payments for the vendor;
   determining an underspend amount for the current payment relative to an amount of the identified cyclical payments for the vendor;
   extracting a difference between the underspend amount of the current payment from the amount of the identified cyclical payments for the vendor; and
   applying the difference to a generated resource from a new source.

3. The system of claim 1, wherein presenting the interactive forecast interface further comprises receiving an approved authentication credential from the user based on an authentication request presented to the user, wherein the authentication request requires user input of authorization credentials for a selected resource available to the user.

4. The system of claim 1, wherein the one or more portions of a session on the display further comprises a web session, text session, or telephone session of the user on the mobile device.

5. The system of claim 1, wherein the mock manipulation of resources to visualize an impact on current and future resource sources the manipulation of the resources has for the user.

6. The system of claim 1, wherein resources comprise financial resources of the user.

7. A computer program product for real-time determination and manipulation of resources, the computer program product comprising at least one non-transitory computer-readable medium having computer-readable program code portions embodied therein, the computer-readable program code portions comprising:
   an executable portion configured for determining resources available to a user including real-time resource levels, schedules, and goals for the resources;
   an executable portion configured for receiving authorization credentials from the user to access the resources, wherein the authorization credentials comprise multiple different usernames and passwords for web based access to information about each resource available to the user;
   an executable portion configured for extracting resource data from a source of each resource available to the user;

an executable portion configured for converting the extracted resource data into a textual format encrypted for use only on an interactive forecast interface, wherein preventing the extracted resource data from being readable in any medium other than the interactive forecast interface if extracted resource data is removed from the interactive forecast interface;

an executable portion configured for monitoring, continually, the resources available to the user for changes in resource levels;

an executable portion configured for generating the interactive forecast interface for presenting the resources available to the user via a mobile device;

an executable portion configured for transmitting an authentication request to the user via the mobile device for the user to provide authorization credentials in order to authorize the user to continue using the interactive forecast interface, wherein the authentication request comprises a request for one username and password of the multiple different usernames and passwords for web based access to information about each resource available to the user, and wherein any of the multiple different usernames and passwords for web based access to information about each resource available to the user may be requested to allow access to the interactive forecast interface;

an executable portion configured for presenting, upon authentication, the interactive forecast interface via overlay on a screen of the mobile device via manipulation and transformation of currently stored applications on the mobile device such that the interactive forecast physically displaces one or more portions of a session of the currently stored applications on the display of the mobile device, wherein the interactive forecast is presented as an overlay on a mobile device screen that is currently presenting a web session, texting session, telephone session, or gaming session and manipulates and transforms the currently presented session;

an executable portion configured for allowing manipulation of resources to move portions of resources to another source, wherein the manipulation is a mock manipulation to mediums of resources for visual implementation of implementing of the mock manipulation illustrating adjustments on current resources; and an executable portion configured for updating interactive forecast interface based on manipulation for current resource allocation and an impact of the manipulation on future resources.

8. The computer program product of claim 7, further comprising:

an executable portion configured for identifying, from the determined resources available to a user, cyclical payments to one or more vendors;

an executable portion configured for parsing each identified cyclical payment to identify an amount, a vendor, date and an account for the cyclical payment;

an executable portion configured for identifying a current payment with the vendor;

an executable portion configured for comparing the current payment to the identified cyclical payments for the vendor;

an executable portion configured for determining an underspend amount for the current payment relative to an amount of the identified cyclical payments for the vendor;

an executable portion configured for extracting a difference between the underspend amount of the current payment from the amount of the identified cyclical payments for the vendor; and an executable portion configured for applying the difference to a generated resource from a new source.

9. The computer program product of claim 7, wherein presenting the interactive forecast interface further comprises receiving an approved authentication credential from the user based on an authentication request presented to the user, wherein the authentication request requires user input of authorization credentials for a selected resource available to the user.

10. The computer program product of claim 7, wherein the one or more portions of a session on the display further comprises a web session, text session, or telephone session of the user on the mobile device.

11. The computer program product of claim 7, wherein the mock manipulation of resources to visualize an impact on current and future resource sources the manipulation of the resources has for the user.

12. The computer program product of claim 7, wherein resources comprise financial resources of the user.

13. A computer-implemented method for real-time determination and manipulation of resources, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

determining resources available to a user including levels, schedules, and goals for the resources;

receiving authorization credentials from the user to access the resources, wherein the authorization credentials comprise multiple different usernames and passwords for web based access to information about each resource available to the user;

extracting resource data from a source of each resource available to the user;

converting the extracted resource data into a textual format encrypted for use only on an interactive forecast interface, wherein preventing the extracted resource data from being readable in any medium other than the interactive forecast interface if extracted resource data is removed from the interactive forecast interface;

monitoring, continually, the resources available to the user for changes in resource levels;

generating the interactive forecast interface for presenting the resources available to the user via a mobile device;

transmitting an authentication request to the user via the mobile device for the user to provide authorization credentials in order to authorize the user to continue using the interactive forecast interface, wherein the authentication request comprises a request for one username and password of the multiple different usernames and passwords for web based access to information about each resource available to the user, and wherein any of the multiple different usernames and passwords for web based access to information about each resource available to the user may be requested to allow access to the interactive forecast interface;

presenting, upon authentication, the interactive forecast interface via overlay on a screen of the mobile device via manipulation and transformation of currently stored applications on the mobile device such that the interactive forecast physically displaces one or more portions of a session of the currently stored applications on the display of the mobile device, wherein the interactive forecast is presented as an overlay on a mobile device screen that is currently presenting a web session, texting session, telephone session, or gaming session and manipulates and transforms the currently presented session;

allowing manipulation of resources to move portions of resources to another source, wherein the manipulation is a mock manipulation to mediums of resources for visual implementation of implementing of the mock manipulation illustrating adjustments on current resources; and updating interactive forecast interface based on manipulation for current resource allocation and an impact of the manipulation on future resources.

14. The computer-implemented method of claim 13, further comprising:

identifying, from the determined resources available to a user, cyclical payments to one or more vendors;

parsing each identified cyclical payment to identify an amount, a vendor, date and an account for the cyclical payment;

identifying a current payment with the vendor;

comparing the current payment to the identified cyclical payments for the vendor;

determining an underspend amount for the current payment relative to an amount of the identified cyclical payments for the vendor;

extracting a difference between the underspend amount of the current payment from the amount of the identified cyclical payments for the vendor; and applying the difference to a generated resource from a new source.

15. The computer-implemented method of claim 13, wherein presenting the interactive forecast interface further comprises receiving an approved authentication credential from the user based on an authentication request presented to the user, wherein the authentication request requires user input of authorization credentials for a selected resource available to the user, wherein the authentication request requires user input of authorization credentials for the selected resource available to the user, wherein the authorization credentials for the selected resource available to the user includes a username and password for web based access to information about the selected resource at a web based server associated with the source for the selected resource.

* * * * *